(12) United States Patent
Christensen et al.

(10) Patent No.: US 11,601,757 B2
(45) Date of Patent: Mar. 7, 2023

(54) AUDIO INPUT PRIORITIZATION

(71) Applicant: Micron Technology, Inc., Boise, ID (US)

(72) Inventors: Carla L. Christensen, Boise, ID (US); Bhumika Chhabra, Boise, ID (US); Zahra Hosseinimakarem, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 46 days.

(21) Appl. No.: 17/006,713

(22) Filed: Aug. 28, 2020

(65) Prior Publication Data

US 2022/0070584 A1 Mar. 3, 2022

(51) Int. Cl.
*H04R 5/04* (2006.01)
*H04R 3/04* (2006.01)
*H04B 1/18* (2006.01)

(52) U.S. Cl.
CPC ............ *H04R 5/04* (2013.01); *H04B 1/18* (2013.01); *H04R 3/04* (2013.01); *H04R 2420/01* (2013.01); *H04R 2430/01* (2013.01)

(58) Field of Classification Search
CPC ...... H04R 27/00; H04R 2217/03; H04R 5/04; H04R 3/00; H04R 3/12; H04R 3/04; H04R 2420/01; H04R 2420/07; H04R 2420/03; H04R 2430/01; G10L 25/00; H04H 20/83; H04H 60/04; H04M 9/08; G06F 3/165; G11B 31/00; H03G 3/00; H03G 3/001; H03G 3/002; H03G 3/3026; H03G 3/32; H03G 1/0088; H03G 1/02; H03F 2200/03; H04B 1/20; H04B 1/18
(Continued)

(56) References Cited

U.S. PATENT DOCUMENTS 6,093,880 A 7/2000 Arnalds
6,801,630 B1 10/2004 Shibata
(Continued)

FOREIGN PATENT DOCUMENTS

KR 10-2013-0113745 A 10/2013
KR 10-1573577 B1 12/2015

OTHER PUBLICATIONS

International Search Report and Written Opinion from related international application No. PCT/2021/041236, dated Nov. 4, 2021, 11 pages.

*Primary Examiner* — Ahmad F. Matar
*Assistant Examiner* — Sabrina Diaz
(74) *Attorney, Agent, or Firm* — Brooks, Cameron & Huebsch, PLLC

(57) ABSTRACT

Systems, apparatuses, and methods related to audio input prioritization are described. Systems may include to one or more sound devices. Audio input may be played on a sound device based on one or more settings applied to the audio input. A setting can be determined based on feedback received by a host. In an example, a method for prioritizing audio input may include receiving a plurality of audio inputs each comprising signaling representative of different sounds, and each from a different application, identifying an attribute of each audio input of the plurality of audio inputs, prioritizing each audio input based on the identified attribute of each audio input, and sending each audio input to a sound device to be played based on the prioritization.

19 Claims, 6 Drawing Sheets

(58) Field of Classification Search
USPC .............. 381/104, 108, 85, 77, 81, 123
See application file for complete search history.

(56) References Cited

U.S. PATENT DOCUMENTS

| | | | |
|---|---|---|---|
| 7,016,266 | B2 | 3/2006 | Wang |
| 7,272,232 | B1 | 9/2007 | Donaldson et al. |
| 8,170,230 | B1* | 5/2012 | Ramirez ................ H04S 1/007 |
| | | | 381/73.1 |
| 8,498,723 | B2 | 7/2013 | Sampat et al. |
| 8,782,122 | B1* | 7/2014 | Chang ................ H04L 67/1048 |
| | | | 709/219 |
| 9,330,720 | B2 | 5/2016 | Lee |
| 10,117,083 | B1 | 10/2018 | Sabatino et al. |
| 2006/0001532 | A1* | 1/2006 | Nagata .................. B60Q 9/008 |
| | | | 340/438 |
| 2006/0073819 | A1 | 4/2006 | Lowles |
| 2008/0032663 | A1* | 2/2008 | Doyle ................ H04H 20/106 |
| | | | 455/345 |
| 2014/0277645 | A1* | 9/2014 | Thirumale ............. G10L 25/48 |
| | | | 700/94 |
| 2015/0098588 | A1 | 4/2015 | Kim |
| 2016/0044151 | A1 | 2/2016 | Shoemaker et al. |
| 2016/0080885 | A1 | 3/2016 | Hampiholi |
| 2016/0165031 | A1* | 6/2016 | Gopinath ............. H04W 8/005 |
| | | | 455/569.2 |
| 2016/0255398 | A1* | 9/2016 | Lee ................ H04N 21/43076 |
| | | | 348/462 |
| 2017/0374484 | A1 | 12/2017 | Lando |
| 2018/0115844 | A1* | 4/2018 | Lu ......................... H04R 27/00 |
| 2018/0146289 | A1* | 5/2018 | Namm .................. H04H 60/65 |
| 2020/0145244 | A1* | 5/2020 | Hollinger ............ H04L 12/2809 |

* cited by examiner

AUDIO INPUT PRIORITIZATION

TECHNICAL FIELD

The present disclosure relates generally to apparatuses, systems, non-transitory machine-readable media, and methods for audio input prioritization.

BACKGROUND

Audio inputs may be received and played using computing devices. A computing device is a mechanical or electrical device that transmits or modifies energy to perform or assist in the performance of human tasks. Examples include thin clients, personal computers, laptops, mobile devices (e.g., e-readers, tablets, smartphones, etc.), internet-of-things (IoT) enabled devices, and gaming consoles, among others. An IoT enabled device may refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device may be connected to sources which may send audio inputs to computing devices. The computing device may play the audio input on a sound device.

DETAILED DESCRIPTION

Figure 1:
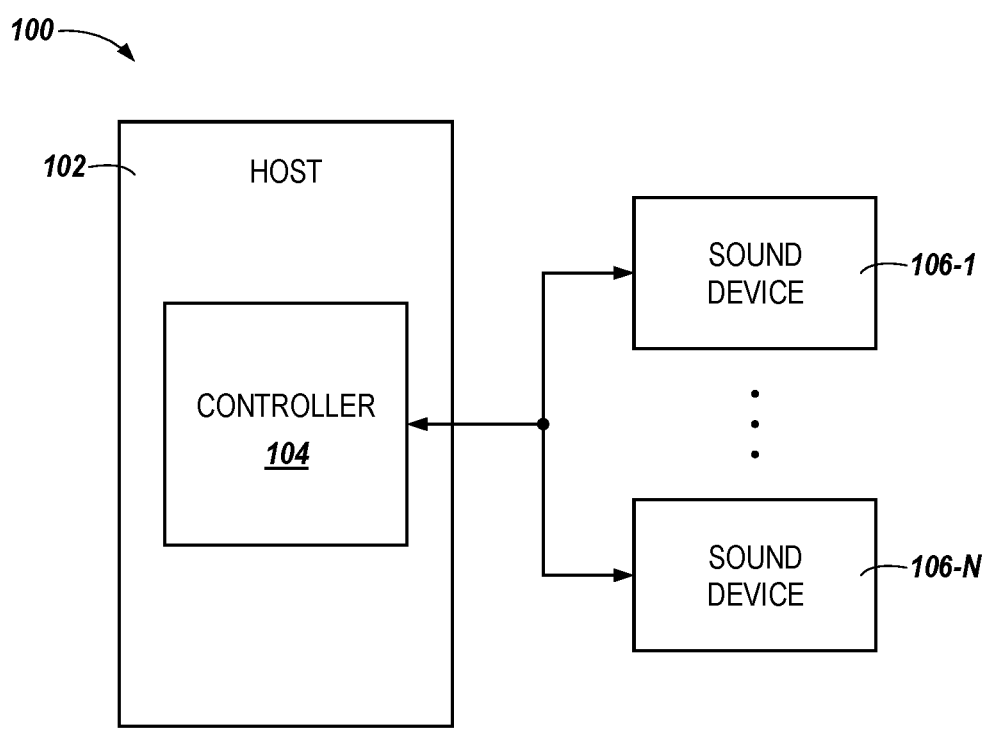
FIG. 1 is a functional block diagram in the form of a computing system including an apparatus including a controller in accordance with a number of embodiments of the present disclosure.

Systems, apparatuses, and methods related to audio input prioritization are described herein. Systems may include one or more sound devices (e.g., speakers, televisions, audio/visual devices, etc.) and may play audio input on the various sound devices. The sound device that plays the audio input may vary based on the attributes of the audio input, such as source, audio type, proximity, tone, and/or quality, etc. Audio input received by a controller may be played on a sound device based on one or more settings applied to the audio input. A setting can be determined based on feedback received by a host. In an example, a method for prioritizing audio input may include receiving a plurality of audio inputs, identifying an attribute of each audio input of the plurality of audio inputs, prioritizing each audio input based on the identified attribute of each audio input, and sending each audio input to a sound device to be played based on the prioritization.

As used herein, the term "audio input" refers to a signal and/or communication that is representative of or causes a particular device to transmit sounds, including sounds intended to convey speech, music, or other audible content to a human user. An audio input may include an electrical signal with certain current and voltage characteristics for transmission via a physical medium (e.g., cabling, circuitry, or air) with certain impedance characteristics. A system may receive audio input from a source and cause the audio input to be played on a sound device. In some embodiments, the system may receive a plurality of audio inputs from a source and cause the audio inputs to be played on the sound device at substantially the same time. Each audio input of the plurality of audio inputs can include signaling representative of different sounds, and each from a different application. As used herein, the term "sound device" refers to a device that converts electrical impulses and/or signals from an audio input into sound. A sound device may include a transceiver, modem, a processor or processors, a microphone, speakers, headphones, or the like. As used herein, the term "application" refers to a computer related program designed to perform a specific task on a host device. For example, an application may be an email application on a mobile device, a music playing application associated with an automobile, or a social media application on a mobile device, etc.

The system may prioritize each audio input of the plurality of audio inputs received and cause each audio input to be played on a sound device based on the prioritization. For instance, the system may determine which audio input to play on a given sound device. In addition, the system may determine which audio input will be the dominate audio input played on a sound device when a plurality of audio inputs are played on the same sound device. Said differently, the system may determine which audio input will play at the highest volume when multiple audio inputs are playing on the same sound device. As used herein, the term "prioritization" refers to ranking audio input from most preferred to least preferred and/or selecting a sound device to play audio input on based on preference.

The system may prioritize each audio input by generating one or more settings. The one or more settings may be determined based on feedback received at the controller. For instance, a sound device may be selected from a plurality of sound device to play an audio input based on the attributes of the sound device and the settings applied to the audio input based on the feedback. Attributes of the sound device may include location, proximity from the source, designated user, sound quality, and/or maximum volume, among other possibilities. In addition, a sound device may play two or more audio inputs at the same time and may play one audio input at a higher volume than the other audio inputs based on the prioritization of each audio input. As used herein, the term "setting" refers to a deterministic guideline to rank audio input based on preference and/or direct audio input to a particular sound device. For example, a setting can establish a sound device to play each audio input on, determine the priority of each audio input, and/or determine the rank for each audio input.

A system including a controller may be coupled to one or more sound devices which may be used to play audio input. In addition, the controller may be coupled to one or more sources. Such audio input may be transferred by a source and received by the controller associated with the system. The controller may cause a sound device to play an audio input based on the priority of the audio input determined by the applied setting.

As hosts such as mobile devices, semi-autonomous vehicles, fully autonomous vehicles, mobile artificial intelligence systems, etc. become more prevalent, devices related to computing systems and hosts are also increasingly prevalent. For example, a host can be a mobile device that includes a controller coupled to one or more sources that can generate audio input. The controller may receive a plurality of audio inputs, each comprising signaling representative of different sounds, and each from a different application, from one or more sources and determine a sound device on which to play each audio input. However, playing the plurality of audio inputs on a sound device without prioritizing the audio inputs may cause an unpleasant sound. As such, the controller associated with the host may apply settings to the attributes of each audio input to determine the priority of each audio input.

For example, some audio input may include attributes, and the attributes may determine the prioritization of the audio input based on a preference of a user and/or a host. As used herein, the term "attribute" refers to aspects and/or characteristics that describes the features of the audio input. Examples, of an attribute may include the source of the audio input (e.g., mobile device, computing device, etc.), type of audio input (e.g., music, instructional, monitoring, etc.), proximity of the source of the audio input to the host and/or sound device, quality of the audio input, and/or tone of the audio input etc. Attributes may be assessed to determine how each audio input will be prioritized. That is, the attributes determine the characteristics of the audio input which may assist the controller in prioritizing each audio input when a setting is applied to the attributes of the audio inputs. Prioritizing a plurality of audio input before playing the audio inputs on a sound device may allow a user to listen to the plurality of audio inputs in their preferred manner and on the same sound device. Moreover, prioritizing a plurality of audio input may be an important endeavor to sound enjoyability by the user.

In some approaches, audio input may be played on a sound device as it is received. A plurality of audio input received at the same time may be played without determining priority of each audio input, which may lead to poor sound quality, hearing sounds from only one of the audio input (which may lead to missing a portion of the audio input), and/or other problems associated with playing a plurality of audio inputs simultaneously. Prioritizing audio inputs before playing the audio inputs may lead to an improved sound quality and provide the user with a more enjoyable experience. For example, a user may be able to clearly hear all sounds from the plurality of audio inputs at the same time leading to an improved sound quality. In addition, a user may be able to send each audio input to the preferred sound device which may lead to a more enjoyable experience, for example.

As mentioned, controllers may be communicatively coupled to devices (e.g., source devices) which may generate audio input to be played on a sound device. As some controllers receive a plurality of audio inputs (e.g., each comprising signaling representative of different sounds, and each from a different application) simultaneously, the ability to produce quality sound may become more tedious. The ability to produced quality sound may be further exacerbated by the inability of some approaches to adequately prioritize multiple audio inputs.

In contrast, embodiments herein are directed to prioritizing a plurality of audio input to be played on one or more sound device communicatively coupled to a controller based on settings determined at the controller, where the audio inputs are generated by one or more sources communicatively coupled to the controller. The controller may prioritize the plurality of audio inputs and select one or more sound devices to play the audio inputs on based on the setting, attributes of the audio inputs, location of the sound device, or combinations thereof. Prioritizing the audio inputs based on the settings generated may determine the appropriate sound device to play each audio input on and/or may determine which audio input is the dominate audio input. As used herein, "dominate audio input" refers to an audio input that has a higher prioritization than another audio input.

User feedback may be a calibration process where a user establishes preferences for attributes of audio input. In some embodiments, the user feedback may be a calibration process where a user establishes a threshold for attribute of an audio input. An audio input that is above or below the threshold may be given a lower or higher prioritization rank and/or played on a particular sound device. A threshold may be pre-established, or machine learned from feedback received, and a setting may be established based on the threshold. In some embodiments, the prioritization rank of an audio input and/or the sound device selected to play an audio input may be updated. Likewise, the threshold for attributes may also be updated and/or changed. As more feedback is received, the system may cause the controller to update the settings based on feedback from the host (e.g., a user). In some embodiments, the updated setting may establish new thresholds and/or new settings.

As mentioned, a setting may be generated at the controller of the system, based on user feedback, and the setting may be applied to newly received audio inputs. Responsive to the application of the setting, the audio inputs may receive an updated rank for prioritization and/or a changed sound device due to the addition of the newly received audio input. For example, in a context of mobile devices, decisions related to playing audio input received from a source may be determined by prioritization. That is, the controller may prioritize each audio input by ranking each audio input from most preferred to least preferred and/or by selecting a sound device to play each audio input based on applied settings. In some embodiments, the controller may play the highest ranked audio input on a first sound device and a lower ranked audio input on a second sound device. In some examples, the highest ranked (e.g., most preferred) audio input may be played at a higher volume than lower ranked (e.g., less preferred) audio input when played from the same sound device.

The prioritization of multiple audio inputs received from one or more sources may be accomplished in a system comprising a host having a controller. A controller may be a processor or other circuitry which is implemented internally in a host. The controller may include hardware, firmware, and/or software to generate settings, determine attributes of the incoming audio input, determine the location of the sound device, determine the proximity of the sound device to the source, and/or select a sound device to play the audio input.

Embodiments herein may allow a controller of the system to rank audio input and/or select a sound device to play audio input, based at least in part, on settings generated by the controller based on feedback, attributes of the audio input, a context of the host, and/or a combination thereof. As will be described herein, in some embodiments, audio inputs prioritized and/or selected to play on a particular sound device may be re-prioritized and/or transferred to a different sound device, based on time, newly received audio inputs, a change in an existing setting, additional feedback, and/or the generation of an updated setting, among other things.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," etc., particularly with respect to reference numerals in the drawings, indicate that a number of the particular feature can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of sound devices) can refer to one or more sound devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. For example, 106 can reference element "06" in FIG. 1, and a similar element can be referenced as 206 in FIG. 2. A group or plurality of similar elements or components can generally be referred to herein with a single element number. For example, a plurality of reference elements 306-1, ..., 306-N (e.g., 360-1 to 306-N) can be referred to generally as 306. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including a controller 104 in accordance with a number of embodiments of the present disclosure. As used herein, an "apparatus" may refer to, but is not limited to, any of a variety of structures or combinations of structures, such as a circuit or circuitry, a die or dice, a module or modules, a device or devices, or a system or systems, for example. The computer system 100 can include a host 102, a controller 104 (e.g., a processor, control circuitry, hardware, firmware, and/or software), and one or more sound devices communicatively coupled to the controller.

FIG. 1 illustrates a non-limiting example of a computing system 100 including a host 102 and a controller 104 communicatively coupled to multiple sound devices 106-1 and 106-N which may be generally referred to as sound device 106. While two sound devices 106-1 and 106-N are illustrated, embodiments are not so limited, and there may be more or less than two sound devices. In a number of embodiments, the controller 104 and sound devices 106-1 and 106-N may be physically located on the host 102. Also, in a number of embodiments, the controller 104 and one sound device 106-1 or 106-N may be physically located on the host 102. In some embodiments, the controller 104 may be located on the host 102 and the sound devices 106-1 and 106-N may not be physically located on the host 102. That is, the sound devices 106-1 and 106-N may be communicatively coupled to the controller 104. As illustrated in FIG. 1, the controller 104 may be coupled to the sound devices 106-1 and 106-N via one or more channels and may be used to transfer audio input from the host 102 to the sound devices 106-1 and 106-N.

The host 102 may be a host system such as a personal laptop computer, a vehicle, a desktop computer, a mobile telephone, or an internet-of-things (IoT) enabled device, among various other types of hosts. The host 102 may include a system motherboard and/or backplane and may include a number of memory access devices (e.g., a number of processing resources, one or more processors, microprocessors, image processor, and/or some other type of controlling circuitry). One of ordinary skill in the art will appreciate that "a processor" may intend one or more processors, such as a parallel processing system, a number of coprocessors, etc.

In some embodiments, the host 102 may be responsible for executing an operating system for the computing system 100 that includes the controller 104. Accordingly, in some embodiments, the host 102 may be responsible for controlling operation of the controller 104. For example, the host 102 may execute instructions (e.g., in the form of an operating system) that manage the hardware of the computer system 100 such as scheduling tasks, executing applications, controlling peripherals, etc.

The computing system 100 may include separate integrated circuits for the host 102 and the controller 104. The computing system 100 may be, for instance, a server system, a high-performance computing (HPC) system, and/or a portion thereof. Although not illustrated in FIG. 1 as to not obscure the examples of the disclosure, the controller 104 may be communicatively coupled (e.g., connected) to sound devices which may be communicatively coupled to the host 102. The term "communicatively coupled" means directly or indirectly connected and, unless stated otherwise, may include a wired and/or wireless connection.

The controller 104 may receive audio input multiple times from an individual source or from multiple sources. For example, the host 102 may be a mobile device coupled one or more sources, and the one or more sources may generate one or more audio inputs. The controller 104 may identify one or more attributes of the audio input. For example, the controller 104 may determine the source of each audio input; analyze the proximity of the source to a sound device, determine the audio type of each audio input, determine the composition of each audio input (e.g., white noise, industrial noise, music, etc.) or combinations thereof, etc. The controller 104 may receive feedback about audio input from a source, and based on the feedback, generate a setting to prioritize the audio input and select a sound device. That is, the setting may determine the prioritization of each audio input and determine the sound device 106 to play each audio input on.

As mentioned, a setting may be determined by feedback. As used herein, the term "feedback" refers to information received by the controller (e.g., controller 104) relating to prioritization preference of audio input, sound device, and/or source. Feedback may be received by the controller 104 from a user of the host 102, from the host 102 via a user configurable setting, and/or from a default setting of the host 102. For example, a feedback may be a user decreasing the volume of a particular audio input and increasing the volume of another audio input, a feedback may be a user changing the sound device (e.g., sound device 106-1) playing the audio input and selecting another sound device (e.g., sound device 106-N) to play the audio input, and/or a user decreasing the volume of an audio input after the user come in close proximity to the source of the audio input. The controller 104 may determine a setting based on a pattern of feedback and/or a single feedback received by the host 102 and/or provided by the user.

In a non-limiting example, a user may provide feedback that causes the controller 104 to prioritize received audio input by ranking each audio input. The controller 104 may generate a setting, based on the feedback, that ranks each audio input based on the preference of the user. For example, the controller 104 may receive audio input in the form of music and receive another audio input in the form of an instructional video. The controller 104 may rank the instructional video audio input higher than the music audio input based on the settings. The controller 104 may then send both audio inputs to a sound device 106 to be played. However, the controller 104 may cause the instructional video audio input to play at a higher volume than the music audio input. That is, if the volume of the sound device 106 is increased or decreased the volume of the instructional video audio input may remain higher than the volume of the music audio input. The controller 104 may modulate the volumes of the audio input to ensure that the instructional video audio input is higher than the other audio inputs. Said differently, based on the preference of the user, the controller 104 may ensure that the highest ranked audio input (e.g., the instructional video audio input) is played at a higher volume than lower ranked audio input (e.g., music audio input) when played on the same sound device 106. The examples herein may describe prompting a user to accept a setting before applying the setting to the audio input. However, it is understood that the controller 104 may apply the generated setting to audio input without acceptance from a user.

In another non-limiting example, a user may provide feedback that causes the controller 104 to prioritize audio input by selecting a sound device 106 to play each audio input. The controller 104 may generate a setting, based on the feedback from the user, that selects a sound device 106 to play each audio input. For instance, the controller 104 may receive audio input in the form of music and receive another audio input in the form of a news channel. Based on the settings, the controller 104 may determine that the news audio input should be at a sound device 106 closer to the host 102 and that the music audio input should be at a sound device 106 that is farther away from the host 102. For example, in this scenario, the controller 104 may send the news audio input to sound device 106-1 located in the same room as the host 102 and send the music audio input to sound device 106-N located in another room. Said differently, based on the preference of the user and the generated settings, the controller 104 may play the highest ranked audio input (e.g., the news audio input) on a sound device (e.g., sound device 106-1) that is near the user and/or host 102 and play a lower ranked audio input (e.g., music audio input) on a sound device (e.g., sound device 106-N) that is farther away from the user and/or host 102.

In yet another non-limiting example, the controller 104 may receive feedback that causes the controller 104 to play audio input from a particular source on a particular sound device 106. That is, the controller 104 may generate a setting that cause audio input from a predetermined source to play on a predetermined sound device 106. For example, the controller 104 may receive an audio input from a first source and a second source. The user may provide feedback informing the host 102 to always play audio input from the first source on a particular sound device (e.g., sound device 106-1). The controller 104 may generate a setting that sends all audio input from a first source to sound device 106-1. In addition, the controller 104 may determine a sound device 106 for the audio input received from the second source, based on generated settings. If the controller 104 determines that the audio input from the second source should be played on the same sound device 106-1 as the audio input from the first sound device, the controller 104 may prioritize the audio inputs by ranking them. The highest ranked audio input may be played at a higher volume than the lower ranked audio input. If the controller determines that the audio input from the second source should be played on another sound device 106-N, the controller 104 may prioritize the audio input by sending the audio input from the second source to another sound device 106-N.

In another non-limiting example, a user and/or the host 102 may provide feedback to a controller 104 by changing the ranking of each audio input and/or changing the sound device 106 selected to play an audio input. For example, the controller 104 may prioritize and play received audio inputs on a sound device 106 based on default settings. The user may alter the prioritization by changing the sound device 106 playing the audio input and/or changing the ranking of one or more audio inputs to provide feedback to the host 102. The controller 104 may generate a setting based on the provided feedback and prioritize the audio input based on the generated settings. That is, the audio inputs may be ranked in a different order and/or played on a different sound device 106 based on the generated settings.

The controller 104 may be configured to apply one or more settings to incoming audio inputs. For example, the controller 104 may apply a source setting (e.g., audio input from a particular source should be played on a particular sound device) and an setting (e.g., audio input of a particular type should be highest ranked) to incoming audio input. That is, the one or more settings when applicable, may be applied to the incoming audio input.

Figure 2:
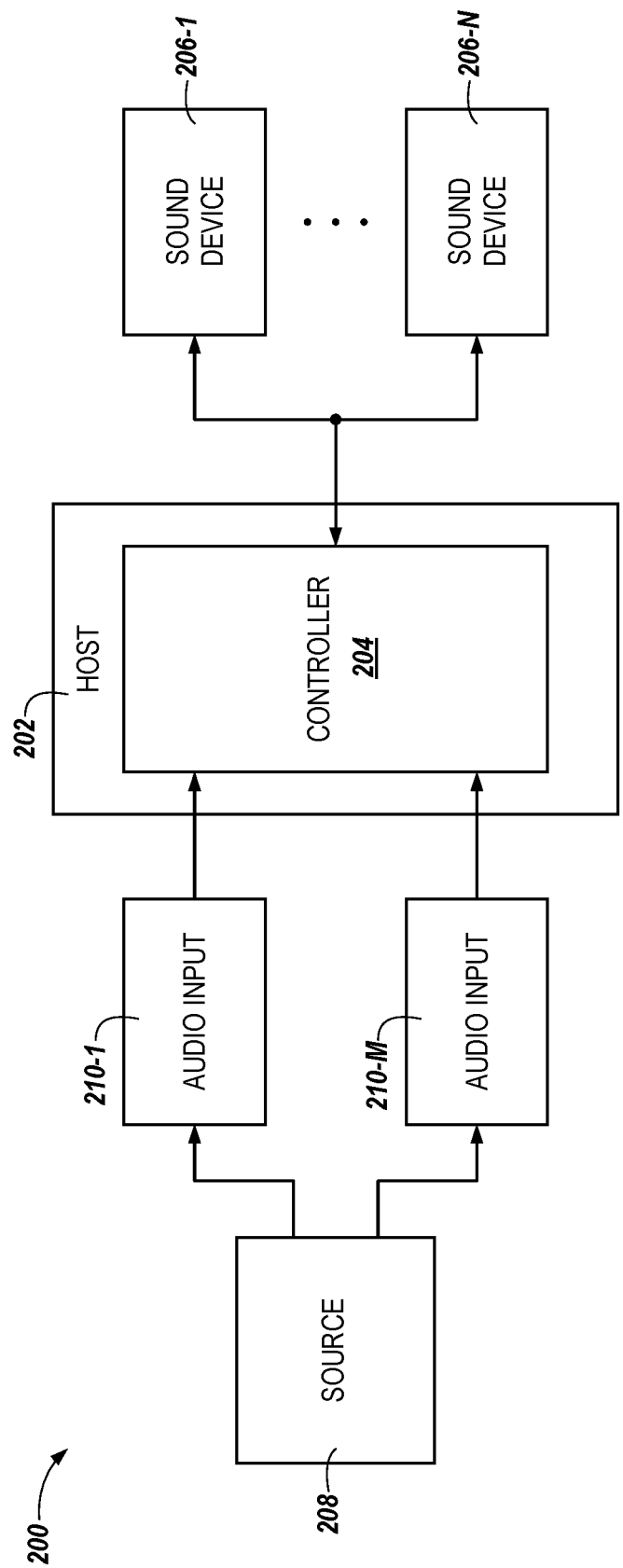
FIG. 2 is a functional block diagram in the form of a computing system including multiple sound devices in accordance with a number of embodiments of the present disclosure.

FIG. 2 is a functional block diagram in the form of a computing system 200 including multiple sound devices 206 in accordance with a number of embodiments of the present disclosure. FIG. 2 illustrates a computing system 200 which includes a host 202, including a controller 204 which may be analogous to the host 102 and controller 104 described in connection with FIG. 1. Computing system 200 includes sound devices 206-1 and 206-N, which may be generally referred to as sound device 206, which may be analogous to the sound device 106 described in connection with FIG. 1. The computing system 200 may include source 208, which may be coupled to the host 202 and produce audio input 210.

The host 202 may be communicatively coupled to the source 208 via a physical connection (e.g., via wiring, circuitry, etc.) or remotely coupled (e.g., via a wireless signal, near field communication, Bluetooth, Bluetooth Low Energy, RFID, etc.). In some embodiments, the host 202 may be communicatively coupled to external hard drives via a physical connection or remotely coupled. FIG. 2 illustrates a non-limiting example of a computer system 200 including a host 202 having a controller 204, a source 208, and sound device 206. The host 202 may receive the audio input 210 generated by the source 208.

The embodiment illustrated in FIG. 2 illustrates an example of the source 208 (e.g., a music player) transmitting audio input 210 to the host 202 (e.g., a mobile device) having a controller 204, where the controller 204 receives the audio input 210 from the source 208. As used herein, the term "source" refers to a device that is capable of transmitting audio input to a host and/or controller. For example, a source 208 may be a mobile device, monitoring device (e.g., baby monitor, alarm system, etc.), television, radio, and/or car etc. that is able to transmit a signal (e.g., audio input 210) to a host 202 and/or a controller 204. In some embodiments, a source 208 and a host 202 may be part of the same device. For example, a mobile device may be a host 202 that is able to obtain audio input 210 from an application on the mobile device and send the audio input 210 to a controller 204.

The controller 204 may receive the audio input 210 from the host 202 and identify one or more attributes of the audio input 210. For example, the controller 204 may identify one or more attributes by determining the source 208 of the audio input 210, analyzing the proximity of the source 208 to the sound device 206, determining the tone of the audio input 210, determining the quality of the audio input 210 and/or determining the type of audio input 210, among other things. The controller 204 may receive feedback from a user and/or the host 202 and generate a setting based on the feedback. As used herein, "tone" refers to a musical or vocal sound with reference to the pitch and strength of the sound.

The determined setting may be based on the feedback from the user and/or host 202 and applied to the audio input 210 based on the attributes of the audio input 210. The attributes of the audio input 210 may be related to the type of audio input. For example, the audio input 210 may be an instructional audio input, monitoring audio input, musical audio input, alerting audio input, and/or informational audio input, etc. generated by a source 208 (e.g., music player). In addition, the attributes of the audio input 210 may be related to the quality of the audio input 210. In some embodiments, the setting may be applied to the audio input based on the quality of the audio input, tone of the audio input, location of the source and sound device for the audio input, and/or source of the audio input, etc. The quality may be subjective to a user and/or host 202 and may include clarity of the sound, audibility of the words in the sound, and/or background interference in the sound, etc. The tone of the audio input 210 may be determined by the controller 204 to be high, low, or in between. The controller 204 may determine settings based on feedback from the user and/or host 202 related to the type of audio input, the quality of the audio input, tone of the audio input, location of the source and sound device for the audio input, and/or source of the audio input, etc.

The setting may be determined by the controller 204 responsive to feedback received from a user and/or host 202. In a non-limiting example, a user and/or host 202 may provide feedback to the controller 204 before audio input is received. The controller 204 may use the feedback provided by the user and/or host 202 to determine a setting and apply the setting to the audio input. In another non-limiting example, the controller 204 may receive audio input 210 from a source 208 and a second feedback about audio input 210 and based on the second feedback a setting may be determined. Based on the determined setting, the controller 204 may prioritize the audio input 210 and play the audio input on a sound device 206.

The computing system 200 may include a mobile device (e.g., the host 202) and a controller 204 communicatively coupled to sound device 206. The controller 204 may be configured to receive audio input 210 from a source 208. The controller 204 may identify one or more attribute of the audio input 210. The attribute may be information about the audio input 210 such as type of audio input, source of the audio input, and/or quality of the audio input, etc. The controller 204 may receive feedback related to attributes of an audio input from a user and/or the host 202. The feedback may be received by the controller 204 responsive to a prompt generated by the host 202 to send the feedback.

The controller 204 may analyze the feedback received from a user and/or host 202 to determine the user and/or the host 202 prioritization preference on audio input 210. Based on the analyzed feedback, the controller 204 may generate a setting to determine how to prioritize the audio input 210. For example, the feedback received may be related to the quality level of the audio input 210 and a threshold quality level of the audio input 210 may be used to generate a setting. The controller 202 may apply the setting (e.g., the quality level setting) to the one or more identified attributes of the audio input 210 to prioritize the audio input 210. For example, the controller 202 may apply the setting (e.g., the quality level setting) to the one or more identified attributes of the audio input 210 to rank the audio input 210 and/or select a sound device 206 on which to play the audio input 210. The setting (e.g., the quality level setting) may be applied to all audio inputs 210-1 and 210-M received by the controller 204 from a source 208.

As more audio input 210 is sent by the source 208, a second feedback may be received by the controller 204. The second feedback may be related to a user and/or host 202 prioritization preferences of audio input 210. For example, the controller 202 may be configured to receive the second feedback and analyze the additional feedback to generate an updated setting. The second feedback may be substantially different than the feedback and may generate an updated setting that is substantially different from the setting. For example, the second feedback may be used to identify changes to the prioritization preference related to the attributes of audio input 210 and generate an updated setting to apply to the audio input 210. Said differently, the second feedback may be received, by the controller 202, from a user indicating that the sound device 206 selection setting from the previous setting (e.g., generated based on the feedback) is no longer desirable. In this example, a new sound device 206 selection setting may be determined for the updated setting and applied to audio input 210. However, this disclosure is not so limited.

In some embodiments, the second feedback may be substantially similar to the feedback. For example, the second feedback may be received from a user indicating that the audio input 210 tone threshold for monitoring devices is substantially the same as the tone threshold for monitoring devices for the previous setting. In this example, the controller 202 may generate an updated setting that is substantially similar to the setting and apply the updated setting to the audio input 210 and/or refrain from updating the setting.

As used herein, the term substantially intends that the characteristic does not have to be absolute but is close enough so as to achieve the characteristic. For example, "substantially similar" is not limited to absolutely similar. Likewise, "substantially different" is not limited to absolutely different.

The change in prioritization preference and development of an updated setting may alter the prioritization (e.g., ranking, sound device selection, etc.) for audio input 210. For example, based on the settings, audio input 210-1 may have been played on sound device 206-1 and/or may have been the highest ranked audio input and now based on the generation of the updated setting from the additional feedback, audio input 210-1 may be played on sound device 206-N and/or may be the lowest ranked audio input. That is, the controller, may update the ranking of each audio input 210 based on a change in an attribute of one of the plurality of audio inputs.

Figure 3:
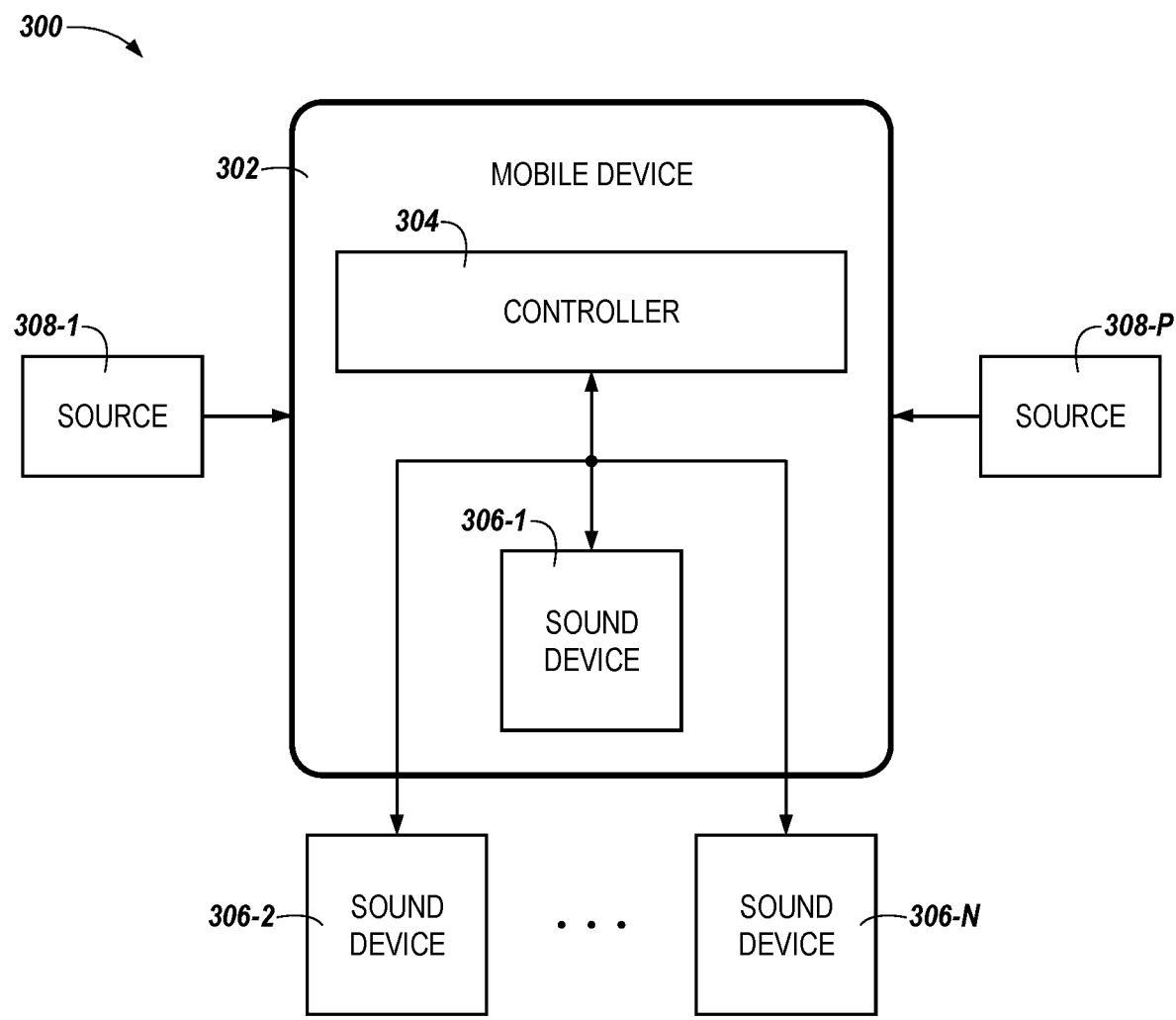
FIG. 3 is a diagram of a computing system including a controller coupled to a host in the form of a mobile device in accordance with a number of embodiments of the present disclosure.

FIG. 3 is a diagram of a computer system 300 including a controller 304 coupled to a host 302 in the form of a mobile device in accordance with a number of embodiments of the present disclosure. The computer system 300 which may be analogous to the computer system 100 respectively described in connection with FIG. 1 may include a host 302. The host 302 may include a controller 304 which may be analogous to the host 102 and controller 104 respectively described in connection with FIG. 1. The host 302 may be communicatively coupled to sources 308-1 and 308-P which may be generally referred to as the source 308 and be analogous to source 208 described in connection with FIG. 2. The host 302 may be coupled to sound devices 306-1, 306-2, and 306-N which may be generally referred to as sound device 306 and may be analogous to sound device 106 described in connection with FIG. 1.

The example host 302 is in the form of a mobile device (e.g., an IoT enabled device). An IoT enabled device may include mobile phones, smart phones, tablets, phablets, computing devices, vehicles, smart home devices, monitoring devices, wearable devices, among other cyber-physical systems.

The computer system 300 may include one or more sound devices 306 coupled to a mobile device host 302. The sound device 306 may be a speaker and/or sound system capable of playing audio input. For example, a sound device 306 may be a mobile device including a speaker, monitoring device including a speaker, television including a speaker, sound bar, vehicle including a sound system etc. In some embodiments, a sound device 306-1 and a host 302 may be part of the same device. For example, the sound device 306-1 may be located on the mobile device host 302. In another embodiments, the sound device 306-2 and 306-N may not be located on the mobile device host 302 and may be communicatively coupled to the mobile device host 302. For example, the mobile device host 302 may cause a controller 304 to send audio input to an external sound device 306-2 and/or 306-N in the form of a sound bar for playing. In another embodiments, a host 302 may include a sound device 306-1 located on the host and an external sound device 306-2 and/or 306-N. For example, as illustrated in FIG. 3, mobile device host 302 includes sound device 306-1 located on the mobile device host 302 and external sound devices 306-2 and 306-N communicatively coupled to the mobile device host 302.

In some embodiments, the source 308 may be located on the mobile device host 302. For example, a mobile device host 302 may include a source 308 to generate audio input and a sound device 306 to play audio input. In some embodiments, the source 308 may not be located on the mobile device host 302 and may be remotely coupled to the mobile device host 302. The location of the source 308 may be an attribute of the audio input and be used to generate a setting. For example, audio input generated by a particular source (e.g., 308-1) may have similar or different settings than audio input generated by another source (e.g., 308-P).

For example, a user of the mobile device 302 may provide different feedback about a user preference on prioritization of audio input generated from a source 308. A user may provide feedback about audio input generated from a source 308-1 that may reflect the prioritization preference for audio input received from source 308-1. Such feedback may be focused on attributes such as tone of the audio input, source of the audio input, type of audio input, quality of the audio input, and/or proximity of the source 308-1 of audio input to a sound device 306, and/or host, etc. The controller 304 may determine one or more settings based on the feedback relating to the audio input and the source 308-1 of the audio input. For example, controller 304 may generate a setting stating all monitoring type audio input from source 308-1 should be played on a particular sound device 306-1 and all other types of audio input from source 308-1 should be played on another sound device (e.g., sound device 306-2 and/or 306-N).

In some embodiments, the audio input may be prioritized based on the proximity of the source 308 of the audio input to the sound device 306 selected to play the audio input. For example, if source 308-P is located in the same room and/or a threshold distance away from sound device 306-N, the controller 304 may determine a setting that prevents audio input from source 308-P from playing on a sound device 306-N located in the same room and/or a threshold distance away from source 308-P. That is, the controller 304 may prioritize audio input received from source 308-P by sending the audio input to a sound device 306-1 and/or 306-2 located in a different room as source 308-P and/or a sound device 306-1 and/or 306-2 outside of the threshold distance. In some embodiments, the controller may update the rank of each audio input based on the proximity to the source of each audio input to the sound device and the generated setting.

The controller 304 may receive audio inputs from one or more of the sources 308 and identify one or more attributes of the audio input for prioritization. The one or more attributes may include a location of the source 308 relative to the one or more sound devices 306. Additionally, or instead of, the identified attributes may be based on one or more similar categories within the audio input. The one or more similar categories may include type of audio input, quality of the audio input, source of the audio input, tone of the audio input, proximity of the source of the audio input to a sound device and/or host, among others, or combinations thereof.

A user of the mobile device 302 may provide feedback related to audio input received from the source 308. The controller 304 may analyze the feedback to determine a user and/or host (e.g., mobile device 302) prioritization preference. For example, the controller 304 may determine based on the analyzed feedback, a setting to apply to one or more attributes. The setting may be used to determine the prioritization of the audio input. For example, the setting, based on the analyzed feedback, may be applied to the identified attributes of the audio input to determine the ranking order of multiple audio inputs and/or the sound device 308 on which to play the audio input. The controller 304 may play multiple audio inputs on the same sound device 306 based on the setting.

In some embodiments, each setting may assist in determining the prioritization of the audio inputs. For example, a determined setting may rank (e.g., prioritize) audio input of a particular type higher than other types of audio input. In this embodiment, a determined setting may cause an informational type audio input to play on the sound device 306-1 closet to the mobile host 302 and cause a music type audio input to play on a different sound device 306-2 and/or 306-N. In another embodiment, a determined setting may play both an informational type audio input and a music type audio input on the same sound device 306 and rank the informational audio input higher than a music type audio input, causing the informational type audio input to play at a higher volume than the music audio type input. In some examples, the controller 304 may play a different lower ranked audio input on a different sound device.

The controller 304 may apply multiple settings to an audio input received from one or more sources 308. The controller 304 may prioritize the audio inputs based on the plurality of settings. For example, a controller 304 may generate settings that rank (e.g., prioritize) audio input by type and by tone. In this embodiment, the controller 304 may rank monitoring type audio input at a threshold tone higher than other types of audio input. That is, a controller 304 may rank an informational type audio input higher than an alarm (monitoring audio input) audio input, until the alarm audio input reaches a threshold tone (e.g., the siren of the alarm may be triggered). Once the alarm audio input reaches a threshold tone, the controller 304 may rank the alarm audio input higher than the informational type audio input. While both audio inputs (e.g., informational audio input and alarm audio input) may be heard on the sound device 306, the highest ranked audio input may be played at a higher volume.

The controller 304 may give precedence to a first setting (e.g., audio input type setting) over a second setting (e.g., volume setting) based on analyzed feedback. For example, the controller 304 may analyze feedback from a user and/or host (e.g., mobile device 302) and determine that a user and/or host desires audio inputs with an identified attributes of a music type to play at a set volume and audio input with an identified attribute of informational type to rank higher than other types. However, the controller 304 may have to decrease the volume of the music type audio input in order to play the highest ranked audio input (e.g., the informational audio input) at the proper volume for the highest ranked audio input. Said differently, the controller 304 may give precedence to the audio input type setting (e.g., first setting) over the volume setting (e.g., second setting). Said differently, if multiple settings are applied to received audio inputs, the controller 304 may give precedence to the setting that best fits the audio input prioritization preference of the user as determined by the analyzed feedback.

The controller 304 may apply multiple settings to audio inputs received from one or more sources 308. In a non-limiting example, a first setting (e.g., quality threshold) may include a threshold, and responsive to receiving a first audio input the controller 304 may determine if the first audio input is above or below the threshold corresponding to the first setting. If the first audio input has attributes that are above the threshold corresponding to the first setting, the controller 304 may give the audio input a high ranking. If the first audio input is below the threshold corresponding to the first setting, the controller 304 may give the audio input a low ranking.

Figure 4:
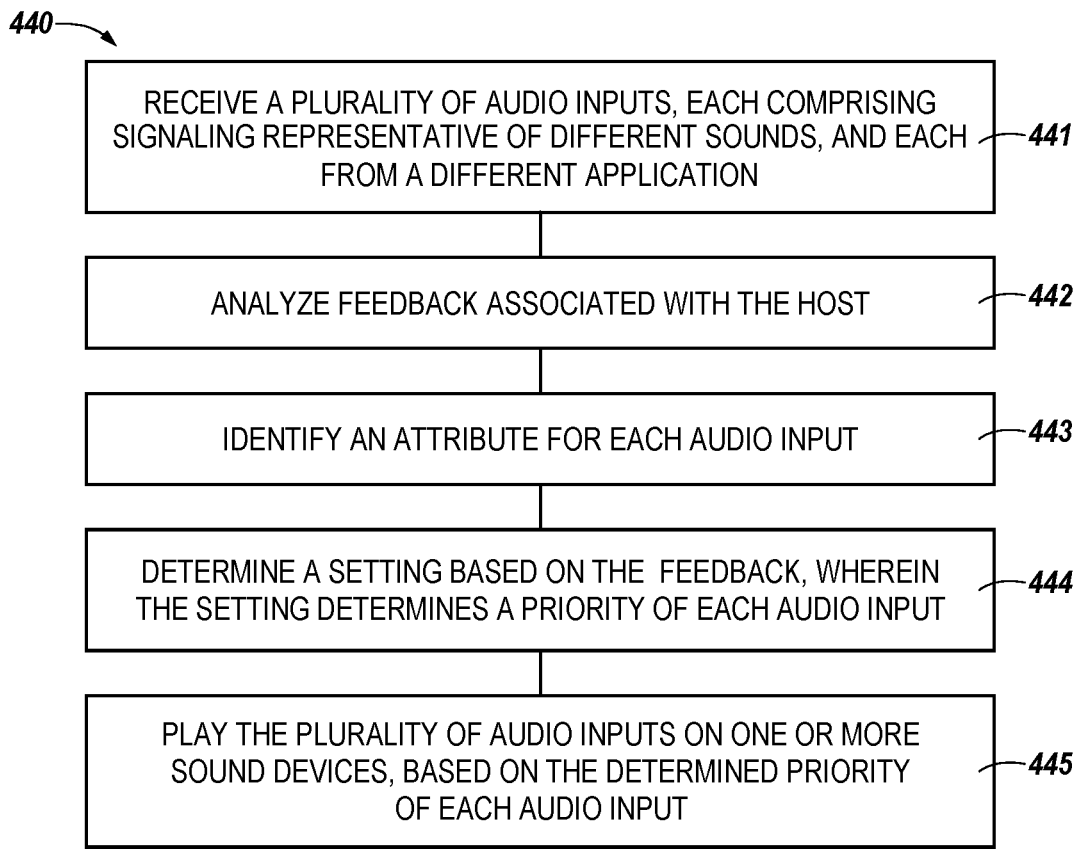
FIG. 4 is a diagram representing an example of audio input prioritization in accordance with a number of embodiments of the present disclosure.

FIG. 4 is a diagram 440 representing an example of audio input prioritization in accordance with a number of embodiments of the present disclosure. FIG. 4 describes an example of a generation of a setting based on feedback from a user and/or a host (e.g., the host 102 of FIG. 1).

In an embodiment described in connection with FIG. 4, a computer system (e.g., computer system 200) including a host (e.g., the host 202) having a controller (e.g., the controller 204) may be communicatively coupled to a sound device (e.g., sound device 206) and a source (e.g., source 208). The computer system (e.g., the computer system 200 of FIG. 2) may include a plurality of sound devices and a plurality of sources. At 441, the flow diagram 440 includes a controller configured to receive a plurality of audio inputs, each comprising signaling representative of different sounds, and each from a different application. The audio input may be received from one or more sources (e.g., the source 208 of FIG. 2) communicatively coupled to the controller. The audio input may include one or more attributes that may assist the controller in prioritizing the audio inputs based on applied settings. In some embodiments, the controller may receive multiple audio inputs from a single source. In another embodiments, the controller may receive multiple audio inputs from multiple sources. That is, the controller may prioritize audio inputs received from a single source, as well as audio inputs received from multiple sources.

At 442, the flow diagram 440, includes a controller configured to analyze feedback associated with the host. For example, the controller may identify attributes such as audio input type or audio input tone. The controller may prompt a user and/or a host for feedback about the attributes of the audio input to determine a user prioritization preference about the attributes of the audio input. That is, the controller may determine the audio input prioritization preference based on the analyzed feedback.

At 443, the flow diagram 440, includes a controller configured to identify an attribute for each audio input of a plurality of audio inputs. A user and/or host may provide feedback to the controller in a variety of ways. For example, the user may provide information related to prioritization preferences to the host. The host may prompt the user to provide a series of selections relating to the prioritization preferences of the user, the prioritization preference may be related to attributes of audio input. For example, the preference may be related to audio input quality, and/or audio input type, etc. As such, the controller may identify the attributes of the audio inputs to apply the prioritization preference to. That is, the controller may analyze each audio input to identify one or more attributes of each audio input.

At 444, the flow diagram 440, includes a controller configured to determine a setting based on the analyzed feedback, wherein the setting determines a priority of each audio input. For example, the audio input may be a video providing instructions to a cooking recipe. The feedback may be feedback from a user stating that instructional audio input types should be played on the sound device closest to the host. The controller may analyze the feedback and determine a setting that causes all instructional audio input types to play on a sound device closet to the host. In another example, the user may provide feedback that causes the controller to determine a setting that plays music type audio input on another sound device. For example, the controller may cause the instructional audio input to play on a sound device closet to the host and the music type audio input to play on a different sound device. Said differently, the controller may analyze the feedback provided by the user and generate a setting based on the prioritization preference of the user. In addition, the controller may apply the generated setting to the identified attributes.

At 445, the flow diagram 440 includes a controller configured to play the plurality of audio inputs on one or more sound devices, based on the determined priority of each audio input. The priority of each audio input determines which sound device to send each audio input. For example, a host having a controller may be coupled to a first sound device and a second sound device, where the first sound device and the second sound device are separate from each other. The controller may generate a setting related to audio input prioritization preference of a user and apply the settings to the audio input to determine a sound device to play the audio input on. For example, the controller may determine that a user prefers music type audio input to be the highest ranked audio input. Based on the analyzed feedback, the controller may determine a user prioritization preference and generate a setting that causes music type audio input to rank the highest. In some embodiments, once each audio input is ranked, the controller may play each audio input of a plurality of audio inputs on a sound device.

In a non-limiting example, a controller may receive a first audio input and a second audio input from a source. A source may be a television with a picture in picture displaying separate channels. Each channel on the television may produce an audio input, for example. The first channel (e.g., first audio input) on the television may be a sports channel (e.g., audio input type attribute) and the second channel (e.g., second audio input) may be a news channel (e.g., audio input type attribute). The television (e.g., source) may send both audio inputs to the controller. The controller may utilize generated settings to prioritize both audio inputs (e.g., the first audio input and the second audio input). That is, the controller may prioritize the audio inputs by sending the audio inputs to the user preferred sound device. For instance, a setting may cause the controller to send sports related audio input (e.g., first audio input) to a first sound device and news related audio input (e.g., second audio input) to a second sound device. That is, the controller may send a first audio input of the plurality of audio inputs to the first sound device; and send a second audio input of the plurality of audio inputs to the second sound device based on the priority of each of the first audio input and the second audio input. When both audio inputs are received by the controller, the controller may apply the generated setting to the attributes of the first audio input (e.g., sports channel) and the second audio input (e.g., news channel). Applying the settings to both audio inputs may cause the controller to send the first audio input (e.g., sports channel) to a first sound device and the second audio input (e.g., news channel) to the second audio input.

Continuing with the previous example, a second source may send a third audio input to the controller. For example, a second source may be a baby monitor. The baby monitor (e.g., second source) may send audio input from the baby monitor (e.g., third audio input) to the controller. The third audio input from the baby monitor may have a monitoring type attribute. The controller may utilize one or more generated settings to prioritize the first, second, and third audio inputs. For instance, in addition to the previous settings, the controller may generate a setting that causes monitoring type audio inputs (e.g., third audio input) to play on all sound devices and play at a higher volume than other audio inputs on the same sound device when a threshold tone is reached. That is, monitoring type audio inputs may be ranked higher than other types of audio inputs. As such, playing each audio input may comprises playing the highest ranked audio input at a higher decibel than the lower ranked audio input. Said differently, the controller may prioritize the first, second, and third audio inputs based on one or more generated settings and apply one or more generated settings to one or more attributes of a given audio input.

For example, the controller may play the third audio input (e.g., audio input from the baby monitor) on both the first sound device and the second sound device. In addition, the controller may play the third audio input at a lower volume than the first audio input on the first sound device and the second audio input on the second sound device. However, when a baby begins to cry and the tone (e.g., attribute) of the third audio input reaches a threshold level, the controller may play the third audio input at a higher volume than the first audio input on the first sound device and the second audio input on the second sound device. That is, the prioritization order of the audio inputs may be changed based on a change in the attributes of the audio inputs. Similarly, the prioritization order of the audio inputs may be changed based on a change in the user feedback and/or generated settings.

Figure 5:
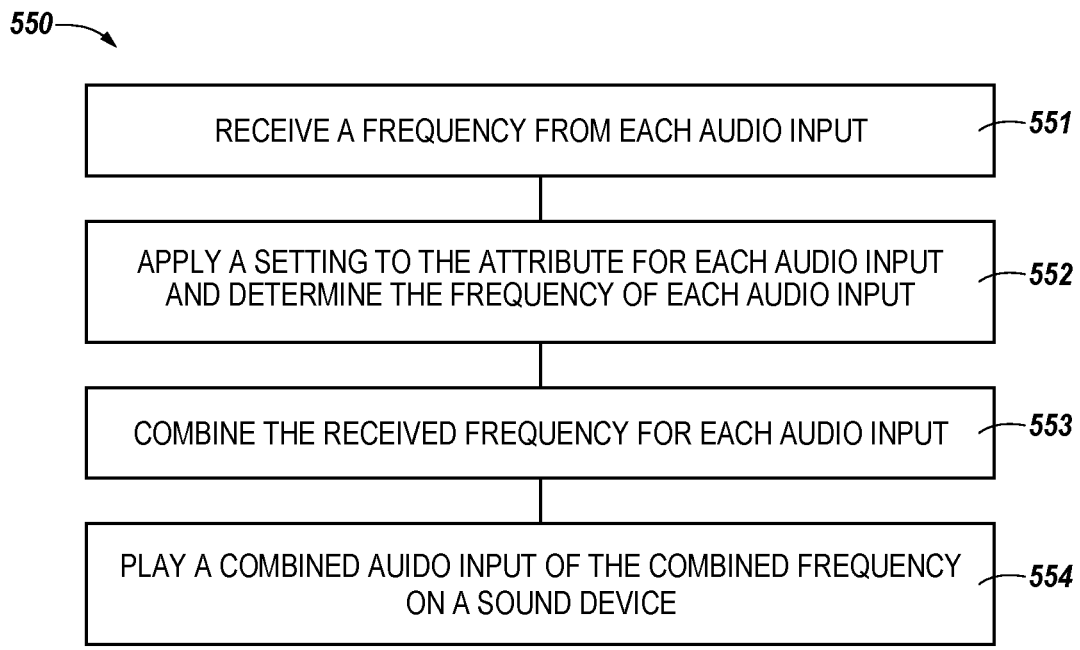
FIG. 5 is another diagram representing an example of audio input prioritization in accordance with a number of embodiments of the present disclosure.

FIG. 5 is another diagram 550 representing an example of audio input prioritization in accordance with a number of embodiments of the present disclosure. FIG. 5 describes an example of applying a setting generated based on feedback from a user and/or a host (e.g., the host 202 of FIG. 2) to attributes of audio inputs and combining the frequency of one or more audio input.

As described herein in connection with FIG. 4, a controller (e.g., the controller 204 of FIG. 2) may be coupled to a host device such as a mobile device (e.g., mobile device 302 of FIG. 3). Settings may be generated by the controller to determine a prioritization for audio inputs. A setting generated based on the analyzed feedback may be applied to audio inputs through the attributes of the audio inputs.

At 551, the flow diagram 550 describes the controller may receive a frequency from each audio input of the plurality of audio inputs. The controller may receive one or more audio inputs from one or more sources. Each audio input may include a frequency to produce a sound. That is, the controller may receive the frequency through the sent audio input. In some embodiments, each audio input may have different frequencies. In contrast, in other embodiments, the frequencies of the audio inputs may be similar. As used herein, a "frequency" refers to the rate at which a vibration occurs that constitutes a wave in a material field.

At 552, the flow diagram 550 describes the controller may apply a setting to the attributes for each audio input and determine the frequency of each audio input. A controller may receive feedback from a user and/or host related to an audio input prioritization preference. The controller may analyze the feedback to generate one or more settings. The settings may assist in determining the prioritization of the audio input. That is, the settings may prioritize audio input based on the prioritization preference of a user as determined by the feedback. The controller may apply the determined setting to the frequency and attributes for each audio input. The controller may analyze each received audio input to determine attributes of each audio input. The attributes may assist the controller in determining which audio inputs should have a higher prioritization. For example, the attributes may provide the controller with information such as the type of audio input, the tone of the audio input, the source of the audio input, the quality of the audio input, etc. The controller may apply the settings to each audio input based on the attributes of each audio input.

In a non-limiting example, a setting may be generated to play the audio input from a source closest to a user at a higher volume than other audio inputs from sources farther away from the user. For example, if the user is in a virtual reality world, the audio input from a cricket closer to the user in the virtual reality world may be louder than the audio input from a stream farther away from the user. Said differently, the controller may rank (e.g., prioritize) the audio input of the cricket over the audio input of the stream based on the generated settings.

In addition, the controller may analyze the frequency of each audio input and the determine the difference in frequencies of each audio input. If the frequencies from the audio inputs are different the controller may combine the audio inputs before playing them on a sound device.

At 553, the flow diagram 550 describes the controller may combine the received frequency for each audio input of the plurality of audio inputs. In some embodiments, if the controller determines that multiple audio inputs are to be played on the same sound device, the controller may combine the frequencies of the audio inputs that are to be played on the same sound device. That is, the controller may analyze the frequencies of the audio input to determine if the frequencies are different. If the frequencies of the audio input are different, the controller may utilize Fourier Transform to combine the frequencies of the audio inputs and play them on the same sound device. That is, the controller may decompose the frequencies and rewrite them together.

At 554, the flow diagram 550 describes the controller may play a combined audio input of the combined frequency on a sound device. The controller may determine the prioritization of each received audio input. The controller may utilize generated settings to determine the prioritization of each audio input by determining the ranking order of each audio input and/or by determining which sound device to play the audio inputs. In some embodiments, the controller may combine the frequency of each received audio inputs and play the combined audio input on the same sound device based on the prioritization preference. That is, the controller may combine the frequencies of each received audio input based on the prioritization of the audio inputs as determined by the applied setting. For example, the controller may receive three or more audio inputs from one or more sources. In some embodiments, the controller may combine the frequencies from all of the received audio inputs and play the combined audio input on the same sound device based on the applied settings. In another embodiment, the controller may combine frequencies from two of the three audio inputs and play the combined audio input on a sound device and play the third audio input on a different sound device based on the applied settings.

Figure 6:
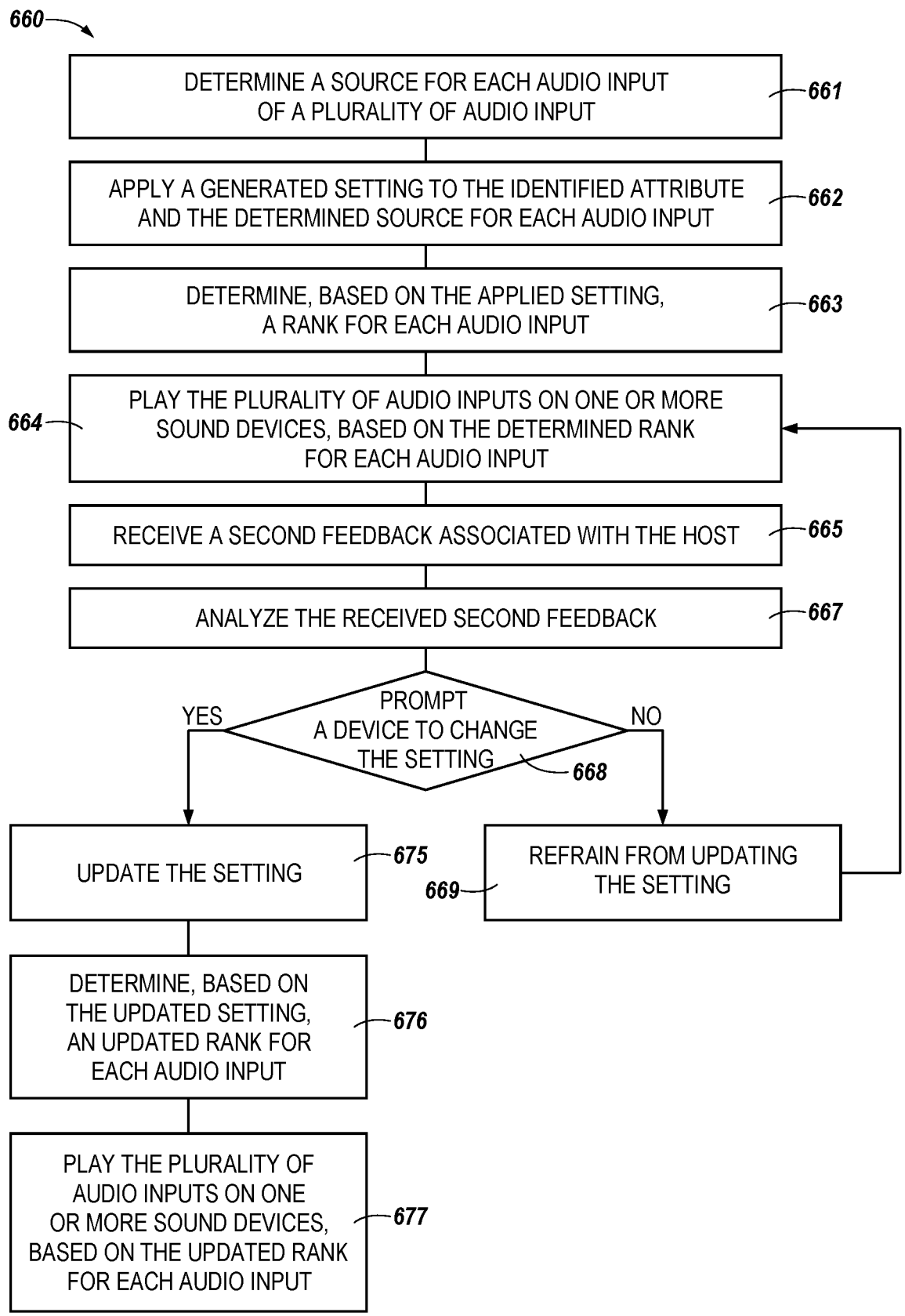
FIG. 6 is another flow diagram representing an example of audio input prioritization in accordance with a number of embodiments of the present disclosure.

FIG. 6 is another flow diagram 660 representing an example of audio input prioritization in accordance with a number of embodiments of the present disclosure. FIG. 6 describes an example of applying a setting generated based on analyzed feedback from a user and/or a host (e.g., the host 202 of FIG. 2) to attributes of audio input.

As described herein in connection with FIGS. 4 and 5, a controller (e.g., the controller 204) may be coupled to a host such as a mobile device (e.g., mobile device 302 of FIG. 3). The host may be communicatively coupled to one or more sound device (e.g., the sound device 206 of FIG. 2). Similarly, the host device may be communicatively coupled to one or more sources (e.g., the source 208 of FIG. 2). One or more settings may be generated by the controller to prioritize the audio inputs and play the audio input on a sound device. A setting generated based on the feedback may be applied to additional each audio input. In some examples, the controller may receive additional and/or a second feedback.

At 661, the controller may determine a source for each audio input of a plurality of audio input. The controller may receive audio input from multiple sources. A user may prioritize the received audio inputs based on the source of the audio input, among other possibilities. The source of the audio input may assist the controller in determining a prioritization preference for each audio input. That is, the source of the audio input may be an attribute of the audio input that may aid in prioritizing the audio input. In some embodiments, the controller may determine one or more attributes of each audio input. The controller may utilize the attributes including the source attribute, to determine a prioritization preference for each audio input.

At 662, the controller may apply a generated setting to the identified attribute and the determined source for each audio input. The controller may analyze feedback from a user and/or host to generate a setting for each audio input. The generated setting may determine the prioritization preference for each audio input. For example, a user may provide feedback to a host that specifies the prioritization preference of the user and the feedback may be used to generate a setting. The controller may analyze the feedback to generate a setting. That is, the generated setting is established based on the user preference and is intended to predict the prioritization preference a user would select for the audio inputs. The generated setting may allow the controller to determine which sound device each audio input should play on. In addition, the generated setting may assist the controller in determining the rank of each audio input.

At 663, the controller may determine, based on the applied settings, a rank for each audio input. The controller may apply the setting to the plurality of audio inputs, by comparing the identified attributes to the generated setting, to prioritize each audio input of the plurality of audio inputs. For example, the generated setting may be to rank monitoring type audio input at the highest level if the tone of the audio input reaches a threshold level. When the controller receives a monitoring type audio input with a tone at the threshold level, the controller may rank the monitoring audio input higher than other audio inputs. That is, the controller may play all of the audio inputs on the same sound device, but may play the monitoring type audio input at a higher volume than the other audio inputs, based on the prioritization preference as determined by the analyzed feedback. In contrast, the controller may play the highest ranked audio input (e.g., monitoring audio input) on a sound device closest to the host and play the other audio inputs on a sound device that is farther away from the host, based on the prioritization preference as determined by the analyzed feedback. That is, the controller may controller may apply the generated settings to the attributes of each audio input to determine the prioritization of each audio input.

At 664, the controller may play the plurality of audio inputs on one or more sound devices, based on the determined rank for each audio input. The controller may play the audio inputs on one or more sound devices based on the prioritization preference of the user. For instance, the controller may rank the audio input based on the generated setting and play the audio inputs on one or more sound device based on the ranking of each audio input.

For example, the controller may, based on analyzed feedback, generate a first setting to play monitoring audio inputs on a first sound device and a second sound device, a second setting to rank monitoring audio inputs that reach a threshold tone higher than all other audio inputs and if the threshold tone is not reached rank the monitoring audio input lower than other audio inputs, and a third setting to rank informational audio inputs higher than other audio inputs. As described herein, the controller may give precedence to a second setting over a first setting or third setting based on analyzed feedback. The controller may receive a music audio input (e.g., music type audio input), a news audio input (e.g., informational type audio input), and an alarm audio input (e.g., monitoring type audio input) from one or more sources. The controller may apply the generated settings to the received audio inputs.

For instance, the controller may rank the news audio input (e.g., informational type audio input) higher than the music audio input (e.g., music type audio input). In addition, the controller may rank the alarm audio input (e.g., monitoring type audio input) higher than the news audio input (e.g., informational type audio input) and the music audio input (e.g., music type audio input) when a threshold tone is reached and lower than the music audio input and the news audio input (e.g., informational type audio input) when the threshold tone is not reached. That is, the volume of the news audio input (e.g., informational type audio input) may be higher than the volume of the music audio input (e.g., music type audio input). In addition, the volume of the news audio input (e.g., informational type audio input) may be higher than the volume of the alarm audio input (e.g., monitoring type audio input) if the alarm audio input has not reached a threshold tone. In contrast, the alarm audio input may be higher than the news audio input (e.g., informational type audio input) and the music audio input (e.g., music type audio input) if the alarm audio input has reached a threshold tone. As described herein, the ranking of the audio inputs may change based on a change in the attributes of an audio input. Further, the controller may play the news audio input (e.g., informational type audio input) and the music audio input (e.g., music type audio input) on a first sound device and the alarm audio input (e.g., monitoring type audio input) on a first and second sound device based on the prioritization preference.

The controller, at 665, may receive a second feedback associated with the host. A user may provide additional and/or second feedback through a host. In some embodiments, the second feedback may provide additional prioritization preference of a user. For example, the second feedback may provide feedback on a subject that was not previously provided. In contrast, the second feedback may provide a change in the prioritization preference of a user. For example, a user may have previously preferred audio input from a first source to play on a first sound device. However, the user may provide a second feedback, at a later time, that changes the previous preference. For instance, the user may now prefer audio input from a first source to play on a second sound device. In another embodiment, the second feedback may affirm a previous prioritization preference of the user.

The controller, at 667, may analyze the second feedback associated with the host to determine an update to the setting. The controller may analyze second feedback to determine if there is a change in user prioritization preference. That is, a user may provide additional feedback at a later point in time to provide audio input prioritization preference to the controller. At 668, the controller may be prompted to update and/or change the setting based on the received second feedback. The controller may compare the second feedback to previous feedback to determine the differences. The controller may analyze the differences between the previous feedback and the second feedback to determine if the setting should be updated. For example, the controller may determine the regularity of each feedback within a set time span to determine if a user preference has changed. Based on the determination of a changed user preference, the controller may either respond yes to the prompt and, at 675, and update the setting or respond no to the prompt and, at 669, and refrain from updating the setting.

At 669, the controller may refrain from updating the setting based on an analyzed second feedback. The controller may determine that the setting should not be updated due to an unchanged user prioritization preference. As such, at 664, the controller may continue to apply the setting to the audio input to play the audio input on a sound device based on the prioritization preference of the user.

At 675, the controller may generate an updated setting based on an analyzed second feedback. The controller may determine that the setting should be updated due to a changed in the prioritization preference of a user. At 676, the controller may determine, based on the updated setting an updated rank for each audio input. The controller may apply the updated setting to the audio input and determine a prioritization preference for the audio input based on the updated settings. For example, the controller may re-rank the audio input when the updates settings are applied to the audio inputs. For instance, the updated settings may cause audio inputs to play on different sound devices and/or may rank previously low-ranking audio inputs higher. In addition, the controller, at 677, may play the plurality of audio inputs on the one or more sound devices, based on the updated rank for each audio input. At 664, the controller may play the plurality of audio inputs on one or more sound devices based on the updated settings determined by the analyzed second feedback.

Figure 7:
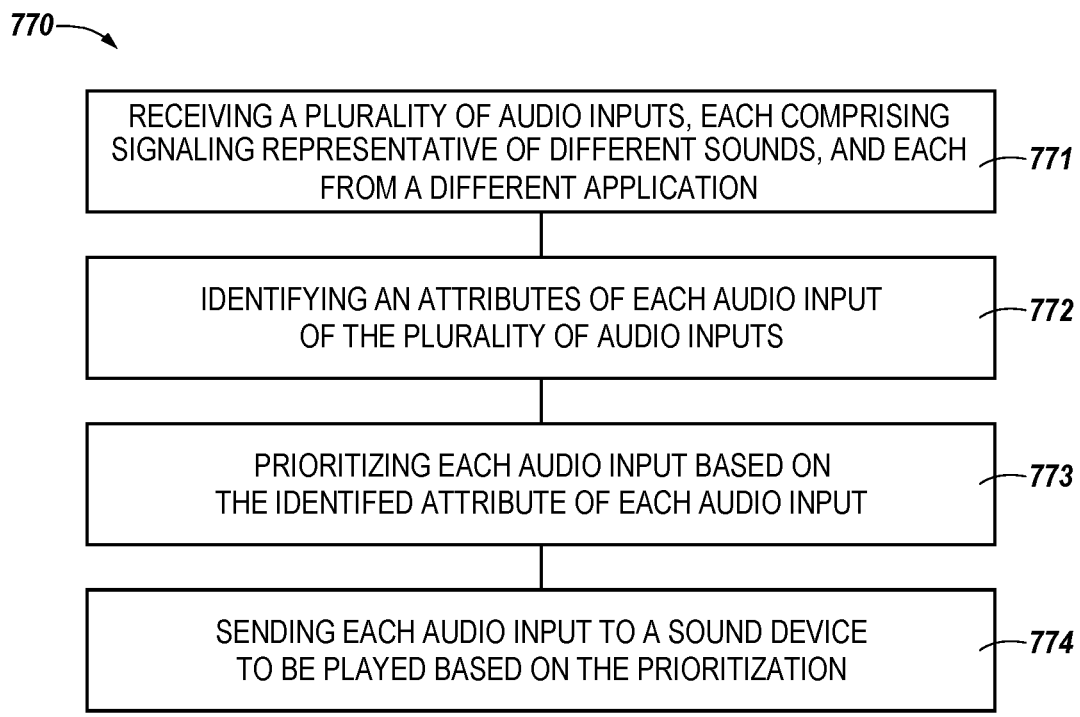
FIG. 7 is a diagram representing an example method for audio input prioritization in accordance with a number of embodiments of the present disclosure.

FIG. 7 is a diagram representing an example method 770 for audio input prioritization in accordance with a number of embodiments of the present disclosure. At block 771, the method 770 may include receiving a plurality of audio inputs, each comprising signaling representative of different sounds, and each from a different application. For instance, the controller may receive a plurality of audio inputs representing different sounds from one or more sources. The controller may prioritize each audio input based on a user prioritization preference. That is, the controller may apply generated settings to each audio input to determine the prioritization preference of the user.

At block 772, the method 770 may include the controller identifying an attribute of each audio input of the plurality of audio inputs. Each audio input sent to the controller by a source may include one or more attributes. The attributes may describe characteristics of the audio input that may be used to prioritize the audio inputs. For example, a user may prefer the audio inputs to be prioritized by their type, quality, source, and/or proximity to another object, among other possibilities. As such, the controller may utilize the identified attributes of the audio inputs to prioritize each audio input.

At block 773, the method 770 may include the controller prioritizing each audio input based on the identified attribute of each audio input. The controller may apply generated settings to the identified attributes of the audio input to prioritize each audio input. That is, prioritizing may comprises ranking each audio input based on the attribute of each audio input. The settings may be generated utilizing user and/or host feedback related to a prioritization preference. Applying the settings to the identified attributes of the audio input may prioritize the audio inputs by ranking the audio inputs from most important to least important and/or by determining the appropriate sound device to play each audio input.

At block 774, the method 770 may include the controller sending each audio input to a sound device to be played based on the prioritization. After each audio input is prioritized, the controller may send each audio input to a sound device based on the prioritization. For example, the controller may receive two audio inputs and determine the prioritization of the two audio inputs based on the applied settings. In some embodiments, the controller may prioritize the two audio inputs by sending one audio input to a first sound device and sending the second audio input to a second sound device. In another embodiment, the controller may prioritize the two audio inputs by sending both audio inputs to the same sound device and ranking one sound device higher than the other sound device. For instance, the controller may send both audio inputs to the same sound device and cause one audio input to play at a higher volume than the other audio input. That is, the controller may rank one audio input higher than the other audio input based on the prioritization preference.

In a non-limiting example, a host may be in the form of a mobile device including a sound device. The controller associated with the host may receive audio input from a source in the form of a baby monitor. The controller may generate a setting that cause the audio input from the baby monitor to play at a high volume when the sound device playing the audio input is a threshold distance away from the baby monitor and play at a low volume when the threshold distance is not met. That is, the controller may modulate the sound of the baby monitor based on the user preference. For example, the controller may cause the sound located on the host to play at a high volume when the sound device and host are 20 feet or more away from the baby monitor. When the sound device and host is within 20 feet from the monitor, the controller may cause the sound device to play the audio input at a lower volume. Said differently, the sound device may play the audio input from the baby monitor at a higher volume when the sound device and host are in a different room than the baby monitor. In addition, the sound device may play the audio input from the baby monitor at a lower volume when the sound device and host are in the same room as the baby monitor. That is, the closer the host and sound device gets to the baby monitor and source of the audio input the lower the volume of the sound device. The controller may change the volume of the audio input based on the change in attribute of the audio input and the prioritization preference of the user.

In another non-limiting example, the host may include a controller, a source, and a sound device. The source may send music type audio input to the controller. The controller may generate a setting that causes music type audio input to play at a set volume when ambient sounds in the environment are below a threshold level and play at a lower volume when ambient sounds in the environment are at or above the threshold level. That is, the controller may modulate the volume of each audio input based on an ambient sound in an environment of the sound device. For example, a user may be listening to the music audio input while running outside. The controller may cause the volume of the audio input playing on the speaker to play at a set volume. In addition, the controller may cause the sound device to reduce the volume of the audio input as a car approaches the user. That is, as the car approaches the user, the ambient sounds in the environment increase above a threshold level and the controller may cause the volume of the audio input to reduce.

Although specific embodiments have been illustrated and described herein, those of ordinary skill in the art will appreciate that an arrangement calculated to achieve the same results may be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving a plurality of audio inputs, each comprising signaling representative of different sounds, and each from a different application;
   identifying an attribute of each audio input of the plurality of audio inputs;
   prioritizing each audio input based on the identified attribute of each audio input;
   determining a setting based on received feedback;
   prioritizing each sound device of a plurality of sound devices based on the setting as applied to the attribute, wherein each sound device of the plurality of sound devices is disconnected from another sound device;
   determining, based on a source of each audio input, whether a distance between the source and each sound device is above or below a distance threshold;
   refraining from sending an audio input of the source to a sound device of the plurality of sound devices below the distance threshold; and
   based on the prioritization, sending the audio input of the source to another sound device of the plurality of sound devices at or above the distance threshold.

2. The method of claim 1, wherein prioritizing each audio input comprises ranking each audio input based on the attribute of each audio input.

3. The method of claim 2, further comprising playing a highest ranked audio input on a first sound device of the plurality of sound devices and a lower ranked audio input on a second sound device of the plurality of sound devices.

4. The method of claim 2, further comprising updating the ranking of each audio input based on a change in an attribute of one of the plurality of audio inputs.

5. The method of claim 1, further comprising playing each audio input of the plurality of audio inputs on a first sound device of the plurality of sound devices.

6. The method of claim 5, wherein playing each audio input comprises playing a highest ranked audio input at a higher decibel than a lower ranked audio input.

7. The method of claim 5, further comprising modulating a volume of each audio input based on an ambient sound in an environment of the sound device receiving each audio input.

8. The method of claim 1, wherein identifying the attribute comprises at least one of:
determining a source of each audio input;
analyzing a proximity of the source to each sound device;
determining a tone of each audio input;
determining a composition of each audio input;
determining an audio type of each audio input; or
combinations thereof.

9. A system comprising:
a plurality of sound devices to play a plurality of audio inputs, wherein each sound device of the plurality of sound devices is separately connected to a controller; and
a host having the controller, wherein the controller is configured to:
receive the plurality of audio inputs, each comprising signaling representative of different sounds, and each from a different application;
analyze feedback associated with the host;
identify an attribute for each audio input of the plurality of audio inputs;
determine a setting based on the analyzed feedback, wherein the setting determines a priority of each audio input of the plurality of audio inputs and a priority of each sound device of the plurality of sound devices;
determine, based on a source of each audio input, whether a distance between each audio input from the source and each sound device is above or below a distance threshold;
refrain from sending an audio input from the source to a sound device of the plurality of sound devices below the distance threshold; and
based on the priority of each audio input, send the audio input from the source to another sound device of the plurality of sound devices at or above the distance threshold.

10. The system of claim 9, wherein the controller is further configured to:
receive a frequency from each audio input of the plurality of audio inputs; and
apply the determined setting to the received frequency and attribute for each audio input.

11. The system of claim 10, wherein the controller is further configured to:
combine the received frequency of each audio input of the plurality of audio inputs; and
play a combined audio input of the combined frequency on a first sound device of the plurality of sound devices.

12. The system of claim 9, wherein each sound device of the plurality of sound devices is separate from each other.

13. The system of claim 12, wherein the controller is configured to send each audio input to a sound device of the plurality of sound devices based on the prioritization of each audio input.

14. The system of claim 9, wherein the controller is further configured to:
analyze a second feedback associated with the host; and
update the setting based on the second feedback.

15. An apparatus comprising:
a controller;
a plurality of sound devices, wherein each sound device of the plurality of sound devices is separately connected to the apparatus; and
a host having the controller configured to:
receive a plurality of audio inputs, each comprising signaling representative of different sounds, and each from a different application;
determine a source of each audio input of the plurality of audio inputs;
identify an attribute for each audio input of the plurality of audio inputs;
analyze received feedback associated with the host;
apply a generated setting to the identified attribute and each sound device of the plurality of sound devices, wherein the setting is determined by the analyzed feedback and the host;
determine, based on the source of each audio input, whether a distance between each audio input and each sound device is above or below a distance threshold;
refrain from sending an audio input of the plurality of audio inputs to a sound device of the plurality of sound devices below the distance threshold;
determine, based on the applied setting, a rank for each audio input of the plurality of audio inputs and a rank for each sound device of the plurality of sound devices; and
based on the ranking, send the audio input to another sound device of the plurality of sound devices at or above the distance threshold.

16. The apparatus of claim 15, wherein the controller is further configured to:
play the plurality of audio inputs on a first sound device or a second sound device of the plurality of sound devices, and
update the first sound device or the second sound device to play the plurality of audio inputs based on a change in the identified attribute of one of the plurality of audio inputs.

17. The apparatus of claim 15, wherein the controller is further configured to play a highest ranked audio input and a lower ranked audio input on a first sound device.

18. The apparatus of claim 17, wherein the controller is further configured to play a different lower ranked audio input on a second sound device.

19. The apparatus of claim 15, wherein the controller is further configured to update the rank of each audio input based on a proximity to the source of the audio input to each sound device and the generated setting.

* * * * *